(12) United States Patent
Schaefer et al.

(10) Patent No.: US 6,909,966 B2
(45) Date of Patent: Jun. 21, 2005

(54) NAVIGATION DEVICE

(75) Inventors: Walter Schaefer, Hildesheim (DE); Peter Herrmann, Giesen (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 10/380,840

(22) PCT Filed: Jul. 4, 2002

(86) PCT No.: PCT/DE02/02442
§ 371 (c)(1),
(2), (4) Date: Sep. 25, 2003

(87) PCT Pub. No.: WO03/012373
PCT Pub. Date: Feb. 13, 2003

(65) Prior Publication Data
US 2004/0054466 A1 Mar. 18, 2004

(30) Foreign Application Priority Data
Jul. 21, 2001 (DE) .......................... 101 35 739

(51) Int. Cl.$^7$ .............................. G01C 21/30
(52) U.S. Cl. .................. 701/209; 701/35; 701/207; 701/211; 340/995.18
(58) Field of Search .................. 701/35, 200, 201, 701/207, 209, 211, 212, 214; 340/988, 990, 995.17, 995.18; 342/357.01, 357.08, 357.13

(56) References Cited

U.S. PATENT DOCUMENTS

| | | | |
|---|---|---|---|
| 5,337,244 A | 8/1994 | Nobe et al. | 701/208 |
| 5,774,828 A | 6/1998 | Brunts et al. | 701/210 |
| 5,964,821 A * | 10/1999 | Brunts et al. | 701/201 |
| 6,088,652 A | 7/2000 | Abe | 701/208 |
| 6,101,443 A * | 8/2000 | Kato et al. | 701/210 |
| 6,128,571 A | 10/2000 | Ito et al. | 701/201 |
| 6,337,224 B1 | 1/2002 | Okamoto et al. | 438/69 |
| 6,687,613 B2 * | 2/2004 | Yokota | 701/209 |
| 6,732,047 B1 * | 5/2004 | de Silva | 701/209 |
| 2002/0183924 A1 * | 12/2002 | Yokota | 701/209 |

FOREIGN PATENT DOCUMENTS

| | | |
|---|---|---|
| DE | 198 21 750 | 12/1999 |
| DE | 101 35 736 | 4/2003 |
| EP | 08 27 124 | 3/1998 |
| JP | 08 327373 | 4/1997 |

OTHER PUBLICATIONS

Excerpt from operating manual for device "Sound 30APS".
Excerpt from operating manual for device "Traffic Pro".

* cited by examiner

*Primary Examiner*—Gertrude A. Jeanglaude
(74) *Attorney, Agent, or Firm*—Kenyon & Kenyon

(57) ABSTRACT

A navigational device in which a position is storable by actuating a control element and this position may be input as a driving destination by re-actuating the control element. This simplifies the input of an often frequented driving destination such as a place of residence.

9 Claims, 1 Drawing Sheet

NAVIGATION DEVICE

FIELD OF THE INFORMATION

The present invention is directed to a navigational device for use in motor vehicles.

BACKGROUND INFORMATION

In Navigation devices a vehicle position is determined using a locating device and a driving route is calculated from a starting point to a driving destination. Driving instructions including turn-off indications are output to the driver. The driving destination is input at the start of the trip via voice input or via a keyboard. Navigational devices may provide for atorage for driving destinations and selection from a list at the start of the trip.

SUMMARY OF THE INVENTION

The navigational device according to an exemplary embodiment of the present invention provides for a simplified entry of a specific, stored position as a driving destination through storing the driving destination by actuating a predefined control element and retrieving it by re-actuating the same, so that this driving destination may be selected without complex re-input or a selection from a list. This makes a particularly quick input possible, without the user having to exactly check the input and without having to search for a given text in a list, e.g., the name of a driving destination. This is advantageous in particular for a commonly-frequented driving destination. The position of a residence or a temporary accommodation, e.g., a hotel during vacation or during a business trip, may be stored. If the user wishes to return to his residence or his accommodation, it is sufficient to actuate the control element in order to input the residence as a driving destination.

In a further embodiment, a current position of the vehicle is stored by a single actuation of the control element for at least a predefined length of time. This facilitates the input of the appropriate positions since, for the input, a manual input or a selection from a list may be dispensed with.

In a further embodiment a position described in a list may be stored by using the control element, which makes it possible to store positions at which the vehicle is not located at the time of storage.

In another embodiment, a map on which the stored position is prominently viewable, is shown on the display of the navigational device thereby making a distance and possibly a route easily visible for the user.

In yet another embodiment, the stored position is input as the driving destination, and a route direction from the current vehicle position to the stored position is automatically started without additional input by the user.

According to yet another embodiment, distance and/or travel time and/or direction from the current position to the stored position are viewable by a single actuation of the control element. Thus, a user may make the distance and time to travel to the stored position easily viewable at any time, even when on a different route which does not include the determined position.

The control element may include a pushbutton or a selection area of a touch screen of the navigational device. Additionally, the control element may include two adjacent pushbuttons which, for storage of the position and for input of the driving destination, are actuated at least approximately simultaneously. Thus, a system of additional pushbuttons on a touch screen becomes redundant. The start of the storage of a new position or a route calculation to the stored position by erroneously pressing only one pushbutton is also prevented.

DETAILED DESCRIPTION

The navigational device may be used in motor vehicles in particular. However, it may also be used in any other vehicles, such as ships, airplanes, or rail vehicles. In addition, the navigational device according to the present invention may also be utilized as a portable device for cyclists and/or pedestrians. A navigational device according to the present invention is explained in the following using a navigational device for a motor vehicle as an example.

Figure 1:
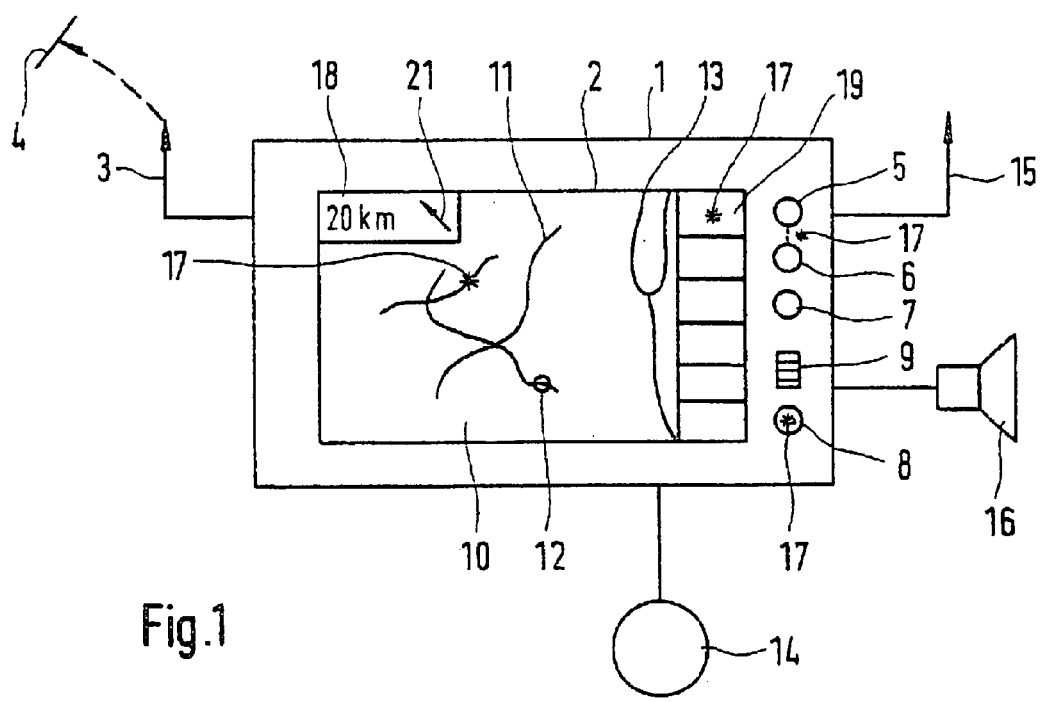
FIG. 1 shows a view of a navigational device according to an exemplary embodiment of the present invention.

A navigational device 1 including a display 2 is illustrated in FIG. 1. Navigational device 1 is preferably integrated into the center console of a motor vehicle. Navigational device 1 communicates with a satellite 4 of a satellite locating system, e.g., the GPS (Global Positioning System), via a first antenna 3. In addition, vehicle location may also take place via vehicle sensors (not shown in FIG. 1) such as partial odometers or rotational speed sensors. In addition, navigational device 1 includes a computing device (not illustrated in FIG. 1) which is integrated into the housing of navigational device 1. The following control elements are situated alongside display 2: pushbuttons 5, 6, 7, 8, and rotary wheel 9. A map 10, including roads 11 and a current vehicle position 12, is viewable on display 2 which may be implemented as a liquid-crystal display. Variable symbol areas 13, depicting functions of navigational device 1, are depicted beside map 10. The individual symbol areas are selectable by actuating rotary wheel 9. A driving destination may be input into navigational device 1 via the control elements. By accessing a digital map, which may be supplied to navigational device 1 via data medium drive 14, the computing device determines from the calculated position a driving route from the current vehicle position to the driving destination which has been input. Traffic information, which may be considered in route planning, is received or queried via a second antenna 15 from either a radio station or a news services center. After completion of the route calculation, driving instructions are output via display 2 and/or via loudspeaker 16 which is also connected to navigational device 1. In a first exemplary embodiment, fourth pushbutton 8 is implemented as a control element according to the present invention. A symbol 17, which indicates the storage of information, is situated on fourth pushbutton 8. In order to provide a simple depiction, a star was selected as such a symbol in FIG. 1. However, fourth pushbutton 8 may also be provided with signs such as "home" or a house symbol. In map 10, the symbol depicted on fourth pushbutton 8 is depicted in an advantageous manner at the positions stored for fourth pushbutton 8. A third pushbutton 7 is available for the request of further functions of navigational device 1.

An operation of the navigational device according to the present invention illustrated in FIG. 1 is explained in the following. It is determined in an initializing step 30 that fourth pushbutton 8 has been pressed. Initialization step 30 is followed by a test step 31 in which it is determined for how long fourth pushbutton 8 has been pressed. If it is determined that fourth pushbutton 8 has been pressed for less than a second then a position determining step 32 follows in which the current vehicle position is determined. In a subsequent calculating and displaying step 33, the distance between the current vehicle position and a stored position is calculated. In a supplementary area 18 of display 2, the distance, displayed in this exemplary embodiment as "20 km" corresponding to a stretch of 20 kilometers, and a driving time, e.g., "10 minutes" (not shown in FIG. 1), are displayed. Moreover, an at least rough direction from the current position to the driving destination is shown as arrow 21. After a specified time has elapsed, e.g., 15 seconds, this display of supplementary area 18 on display 2 expires and the operation sequence is completed via a final step 34. If it is determined in test step 31 that fourth pushbutton 8 has been pressed for more than 5 seconds then a current vehicle position is determined in a localizing step 35 via first antenna 3. In a subsequent memory step 36, the determined current vehicle position is stored, in a non-volatile manner, in a memory unit which is integrated into navigational device 1. The memory device may be designed, e.g., as a ROM ("read only memory") or, e.g., as a RAM ("random access memory") battery-buffered by the vehicle accumulator. The operation is subsequently completed via final step 37. The determined vehicle position is thus stored for further actuations of fourth pushbutton 8 or for other selections by the user. If it is determined in first test step 31 that fourth pushbutton 8 has been pressed for more than 1 second but less than 5 seconds, then the current vehicle position is determined in a localizing step 38. The driving route from the current vehicle position to the stored position is determined in a subsequent route calculating step 39. A driving route, which may be determined taking into account traffic information, is output to a user in a subsequent output step 40 via display 2 and/or loudspeaker 16. The operation is completed via final step 41. The output of driving instructions along the calculated route is included in this case.

Figure 2:
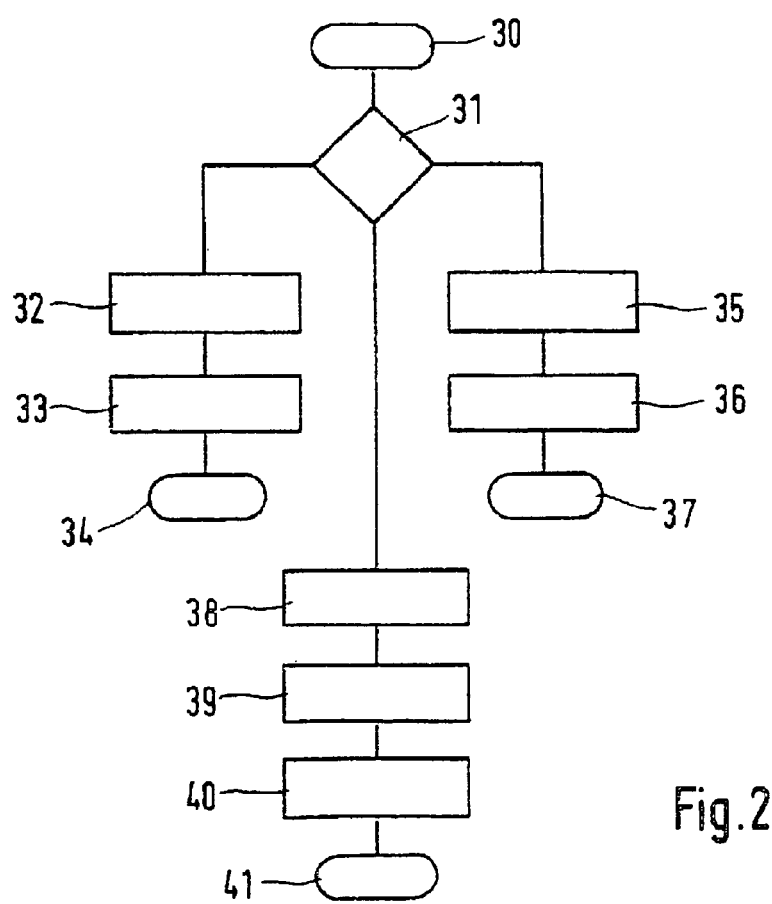
FIG. 2 shows an exemplary operating sequence of the navigational device according to an exemplary embodiment the present invention.

Instead of or in addition to fourth pushbutton 8, a symbol area 19 of symbol areas 13 may also be designed as a control element in which symbol 17 is depicted and whose actuation enables both a vehicle position to be stored and a driving destination to be input. The operating sequence is equivalent to the method described in FIG. 2.

Instead of fourth pushbutton 8, first pushbutton 5 and second pushbutton 6 may also form a control element, for example, so that a position is stored or input as a driving destination when first pushbutton 5 and second pushbutton 6 are jointly and approximately simultaneously actuated. A joint actuation of first pushbutton 5 and second pushbutton 6 is marked by symbol 17.

Addresses and names of places and persons which are viewable in a selection frame (not shown in FIG. 1) by actuating rotary wheel 9 may also be depicted in symbol areas 13. If such a selection is followed by the actuation of fourth pushbutton 8, the control element formed by pushbuttons 5 and 6, or symbol area 19 then, instead of the current vehicle position, the position displayed on the selected symbol area is stored. Storage may take place in the form of geographical coordinates, as a mere name identifier, or as a set of address data. Moreover, a position may be directly stored in the map inserted in data medium drive 14.

What is claimed is:

1. A navigational device for navigating a vehicle through a road network, comprising:

a first arrangement to provide a driving route from a starting point to a destination point;

a second arrangement to determine a current vehicle position; and a control element that is actuatable to store the current vehicle position in a memory arrangement, and that is re-actuatable to input stored position for use as the destination point.

2. The navigational device of claim 1, wherein the current vehicle position is stored by actuating the control element at least for a specified length of time.

3. The navigational device of claim 1, further comprising:

a display to display at least one of a place, an address, and a geographical point;

wherein a position of at least one of a selected place, address and geographical point is storable by actuating the control element at least for a predefined length of time.

4. The navigational device of claim 3, wherein the display is operable to display a map that prominently shows the stored position.

5. The navigational device of claim 1, wherein a route direction from the current vehicle position to the stored position is automatically started upon input of the stored position as the driving destination.

6. The navigational device of claim 3, wherein at least one of a distance, a travel time and a direction from the current vehicle position to the stored position is displayable by actuating the control element.

7. The navigational device of claim 1, wherein the control element includes at least one pushbutton.

8. The navigational device of claim 7, wherein the control element includes two adjacent buttons, and the control element is actuatable by at least approximately simultaneously actuating the two adjacent buttons.

9. The navigational device of claim 1, wherein the control element includes a selection area of an operating surface.

* * * * *